(12) United States Patent
Petrulescu et al.

(10) Patent No.: US 7,260,513 B2
(45) Date of Patent: *Aug. 21, 2007

(54) SYSTEM AND METHOD FOR ANALYTICALLY MODELING DATA FROM DIFFERENT MEASURE GROUPS ONTO A SINGLE CUBE

(75) Inventors: Cristian Petrulescu, Redmond, WA (US); Amir Netz, Bellevue, WA (US); Mosha Pasumansky, Redmond, WA (US); Alexander Berger, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 258 days.

This patent is subject to a terminal disclaimer.

(21) Appl. No.: 10/606,343

(22) Filed: Jun. 25, 2003

(65) Prior Publication Data

US 2004/0015513 A1 Jan. 22, 2004

Related U.S. Application Data

(63) Continuation-in-part of application No. 10/199,612, filed on Jul. 19, 2002.

(51) Int. Cl.
*G06F 17/10* (2006.01)
*G06F 7/60* (2006.01)

(52) U.S. Cl. ............... 703/2; 707/2; 707/3; 707/100; 707/102

(58) Field of Classification Search .............. 703/2; 707/2, 3, 100, 102, 104.1
See application file for complete search history.

(56) References Cited

U.S. PATENT DOCUMENTS

| | | | |
|---|---|---|---|
| 6,205,447 B1 * | 3/2001 | Malloy | 707/102 |
| 6,480,836 B1 * | 11/2002 | Colby et al. | 707/3 |
| 6,775,675 B1 * | 8/2004 | Nwabueze et al. | 707/100 |
| 6,985,906 B2 * | 1/2006 | Yamashita | 707/102 |
| 2002/0059267 A1 * | 5/2002 | Shah et al. | 707/100 |
| 2003/0126143 A1 * | 7/2003 | Roussopoulos et al. | 707/100 |
| 2004/0122813 A1 * | 6/2004 | Shah et al. | 707/3 |

OTHER PUBLICATIONS

Espil, M.M. et al., "Efficient Intensional Redefinition of Aggregation Hierarchies in Multidimensional Dayabases", *DOLAP*, Nov. 9, 2001, 8 pages.
Harinarayan, V. et al., "Implementing Data Cubes Efficiently", *SIGMOD*, 1996, 205-216.
Hurtado, C.A. et al., "Updating OLAP Dimensions", *DOLAP*, 1999, 60-66.
Nieme, T. et al., "Constructing OLAP Cubes Based on Queries", *DOLAP*, Nov. 9, 2001, 9-15.
Pourabbas, E. et al., "Characterization of Hierarchies and Some Operators in OLAP Environment", *DOLAP*, 1999, 54-59.
Chaudhuri, S. et al., "An Overview of Data Warehousing and OLAP Technology", *SIGMOD Record*, Mar. 1, 1997, XP-00219372, 26(1), 65-74.
Pedersen, T.B. et al., "Multidimensional Data Modeling for Complex Data", *Proceedings of ICDE*, 1999, 25 pages, XP-002369235.

* cited by examiner

*Primary Examiner*—Paul Rodriguez
*Assistant Examiner*—Andre Pierre-Louis
(74) *Attorney, Agent, or Firm*—Woodcock Washburn LLP (57) ABSTRACT

A system and method for analytically modeling data from different measure groups onto a single cube are disclosed. The single cube preferably includes a first measure associated with a first measure group with a first set of corresponding dimensions. The single cube preferably also includes a second measure associated with a second measure group with a second set of corresponding dimensions. The single cube preferably also includes each dimension in both the first and second set of dimensions. Each measure is preferably tied to each corresponding dimension according to data in an underlying relational data table. Each measure is preferably tied to each non-corresponding dimension according to an approximation.

21 Claims, 6 Drawing Sheets

| Sale 200 | | |
|---|---|---|
| Customer ID 210 | Product ID 220 | Sale Amount 230 |
| 1 | A | 12 |
| 1 | D | 8 |
| 1 | F | 5 |
| 2 | B | 18 |
| 2 | E | 12 |
| 3 | C | 30 |

Fig. 3

| Forecast 300 ||
|---|---|
| Product Category ID 310 | Forecast Amount 320 |
| x | 30 |
| y | 10 |
| z | 2 |

Fig. 4

| Customer 400 ||
|---|---|
| Customer ID 410 | City 420 |
| 1 | New York |
| 2 | Los Angeles |
| 3 | Chicago |

Fig. 5

| Product 500 ||
| --- | --- |
| Product ID 510 | Product Category ID 520 |
| A,B,C | x |
| D,E | y |
| F | z |

Fig. 6

SYSTEM AND METHOD FOR ANALYTICALLY MODELING DATA FROM DIFFERENT MEASURE GROUPS ONTO A SINGLE CUBE

CROSS REFERENCE TO RELATED APPLICATIONS

This is a continuation-in-part of application Ser. No. 10/199,612, filed Jul. 19, 2002.

BACKGROUND OF THE INVENTION

1. Field of the Invention

The present invention relates to the field of analytically modeling data organized and stored in a relational database.

2. Description of the Prior Art

Online analytical processing (OLAP) is a key part of many data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, an OLAP cube may be modeled according to a user's perception of the data. The cube may have multiple dimensions, each dimension modeled according to attributes of the data. Typically, there is a hierarchy associated with each dimension. For example, a time dimension can consist of years subdivided into months subdivided into weeks subdivided into days, while a geography dimension can consist of countries subdivided into states subdivided into cities. Dimension members act as indices for identifying a particular cell or range of cells within the cube.

OLAP services are often used to analytically model data that is stored in a relational database such as, for example, an Online Transactional Processing (OLTP) database. Data stored in a relational database may be organized according to multiple tables with each table having data corresponding to a particular data type. A table corresponding to a particular data type may be organized according to columns corresponding to data attributes. For example, data corresponding to the type "Sales" may be organized in a "Sales" table with columns "Customer ID" "Product ID" and "Sale Amount". Data corresponding to the type "Forecast" may be organized in a "Forecast" table with columns "Product Category ID" and "Forecast Amount". Unlike the "Sales" table, the "Forecast" table does not include a "Customer ID" column because forecast data for particular customers is unknown.

Related to the concept of analytically modeling data is the concept of a "measure". Such a measure is an attribute that measures a data type according to other attributes. For example, in the "Sales" table, the attribute "Sale Amount" is a measure for sales, and, in the "Forecast" table, the attribute "Forecast Amount" is a measure for forecast. Measures which are organized according to common attributes may comprise a measure group, while measures which are organized according to different attributes may comprise different measure groups. For example, the measure "Sale Amount" may belong to a "Sales" measure group with the attributes "Customer" and "Product", while the measure "Forecast Amount" may belong to a "Forecast" measure group with only the attribute "Product".

In an OLAP environment, it is often desirable to obtain a single view of data from different measure groups. For example, it may be desirable to obtain a single view of both "Sales" data and "Forecast" data to analyze forecasted sales by customer. In conventional OLAP systems, however, to obtain such a single view, data from each measure group must be modeled onto separate "underlying" cubes, and the underlying cubes must be combined into a "virtual cube". Modeling such multiple underlying and virtual cubes introduces several drawbacks. For example, processing involved with defining and maintaining multiple cubes results in significant overhead. Furthermore, changes to an underlying cube must be redundantly propagated at the virtual cube. Accordingly, a need exists for systems and methods for analytically modeling data from different measure groups onto a single cube.

SUMMARY OF THE INVENTION

Accordingly a system and method for analytically modeling data from different measure groups onto a single cube are disclosed. A first table and a second table are stored in a relational database. The first table organizes a first type according to a first attribute. The second table organizes a second type according to a second attribute.

The data stored in the relational database is analytically modeled in a data cube. A first measure is modeled according to the first type of the first table. A first dimension is modeled according to the second attribute of the second table. The first measure is tied to the first dimension by, for each entry of the first attribute, allocating the entry to each entry of the second dimension in a predetermined manner.

The first measure may be tied to the first dimension by allocating the entry to every one of select entries of the first dimension. The first measure may be tied to the first dimension by allocating a portion of the entry to each of select entries of the first dimension. The portion may be an even portion of the entry or it may be a proportional portion. The first measure may also be tied to the first dimension by allocating the entry to a pre-determined principal entry of the first dimension.

A second dimension may also be modeled according to the first attribute of the first table. The first measure may also be tied to the second dimension according to the first attribute of the first table to allow the first measure to be analyzed by the second dimension according to the first attribute.

A second measure may also be modeled according to the second type of the second table. The second measure may be tied to the second dimension by, for each entry of the second attribute, allocating the entry to each entry of the second dimension in a predetermined manner. The second measure may also be tied to the first dimension according to the second attribute of the second table to allow the second measure to be analyzed by the first dimension according to the second attribute.

BRIEF DESCRIPTION OF THE DRAWINGS

The illustrative embodiments will be better understood after reading the following detailed description with reference to the appended drawings, in which.

DETAILED DESCRIPTION

A system and method for analytically modeling data organized according to non-referred attributes is disclosed below with reference to the aforementioned drawings. Those skilled in the art will readily appreciate that the description given herein with respect to those drawings is for explanatory purposes only and is not intended in any way to limit the scope of the invention to the specific embodiments shown. Throughout the description, like reference numerals are employed to refer to like elements in the respective figures.

Computer Environment

Figure 1:
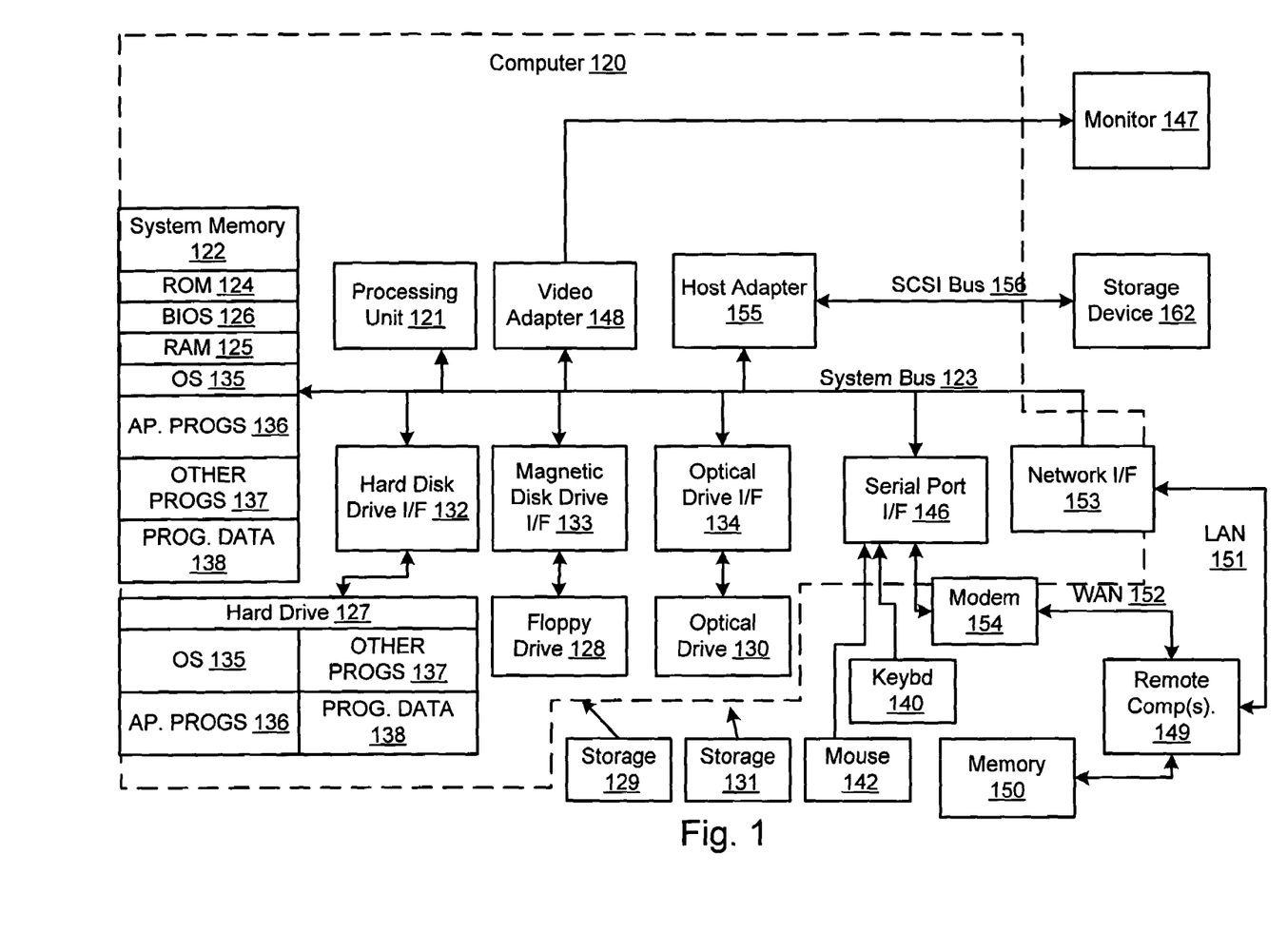
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media.

The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

An analytical data service such as, for example, On-Line Analytical Processing (OLAP) may be employed to model data stored in a relational database such as, for example, an On-Line Transactional Database (OLTP). As set forth previously, data stored in a relational database may be organized according to multiple tables, with each table having data corresponding to a particular data type. A table corresponding to a particular data type may be organized according to columns corresponding to data attributes.

Figure 2:
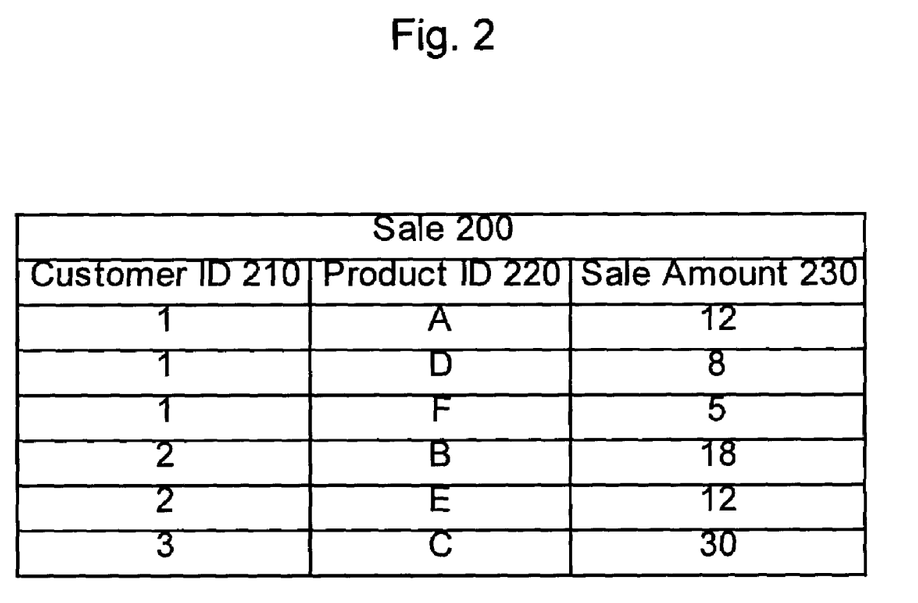
FIG. 2 is a sample relational database table corresponding to "Sales" data.
Figure 3:
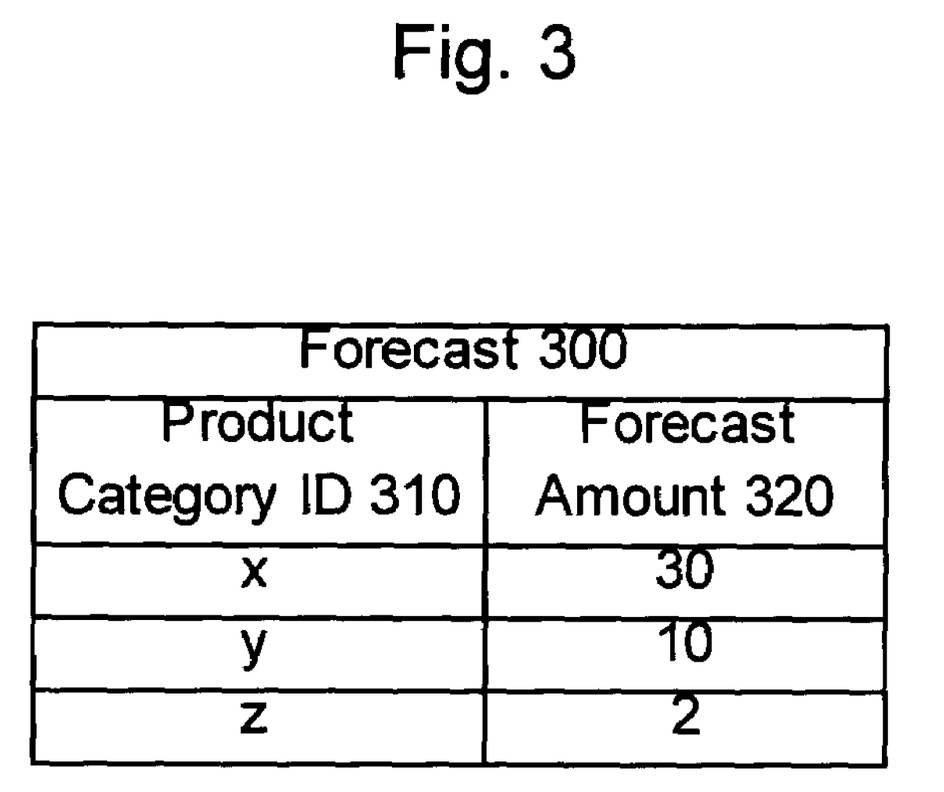
FIG. 3 is a sample relational database table corresponding to "Forecast" data.
Figure 4:
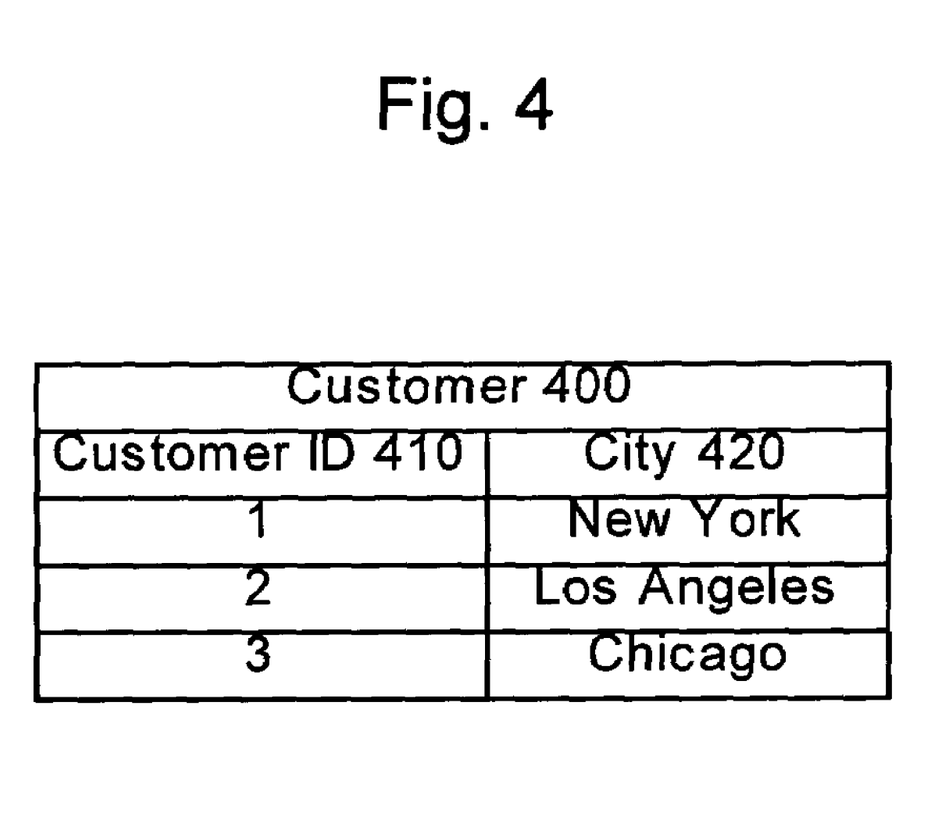
FIG. 4 is a sample relational database table corresponding to "Customer" data.
Figure 5:
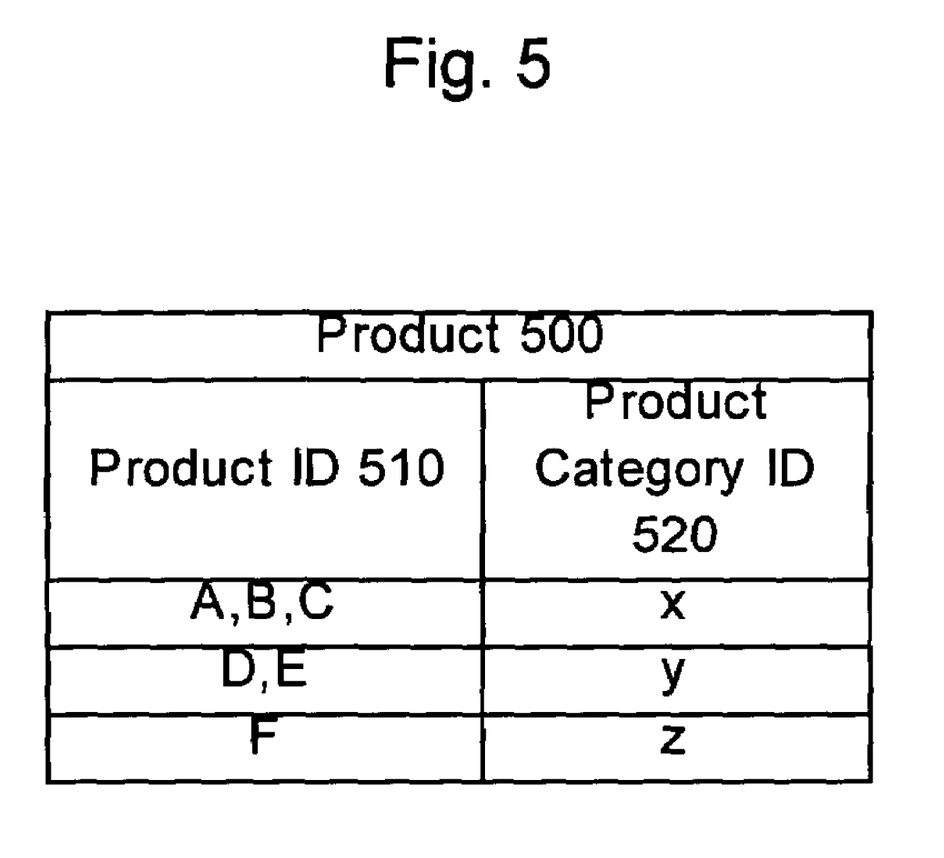
FIG. 5 is a sample relational database table corresponding to "Product" data.

One such table is shown in FIG. 2, with data corresponding to the type "Sales" organized in a "Sales" table 200 with columns "Customer ID" 210, "Product ID" 220, and "Sale Amount" 230. Another such table is shown in FIG. 3, with data corresponding to the type "Forecast" organized in a "Forecast" table 300 with columns "Product Category ID" 310 and "Forecast Amount" 320. Another such table is shown in FIG. 4, with data corresponding to the type "Customer" organized in a "Customer" table 400 with columns "Customer ID" 410 and "City" 420. Another such table is shown in FIG. 5, with data corresponding to the type "Product" organized in a "Product" table 500 with columns "Product ID" 510 and "Product Category ID" 520. As should be appreciated, tables 200-500 may have other columns (not shown) corresponding to other attributes.

Figure 6:
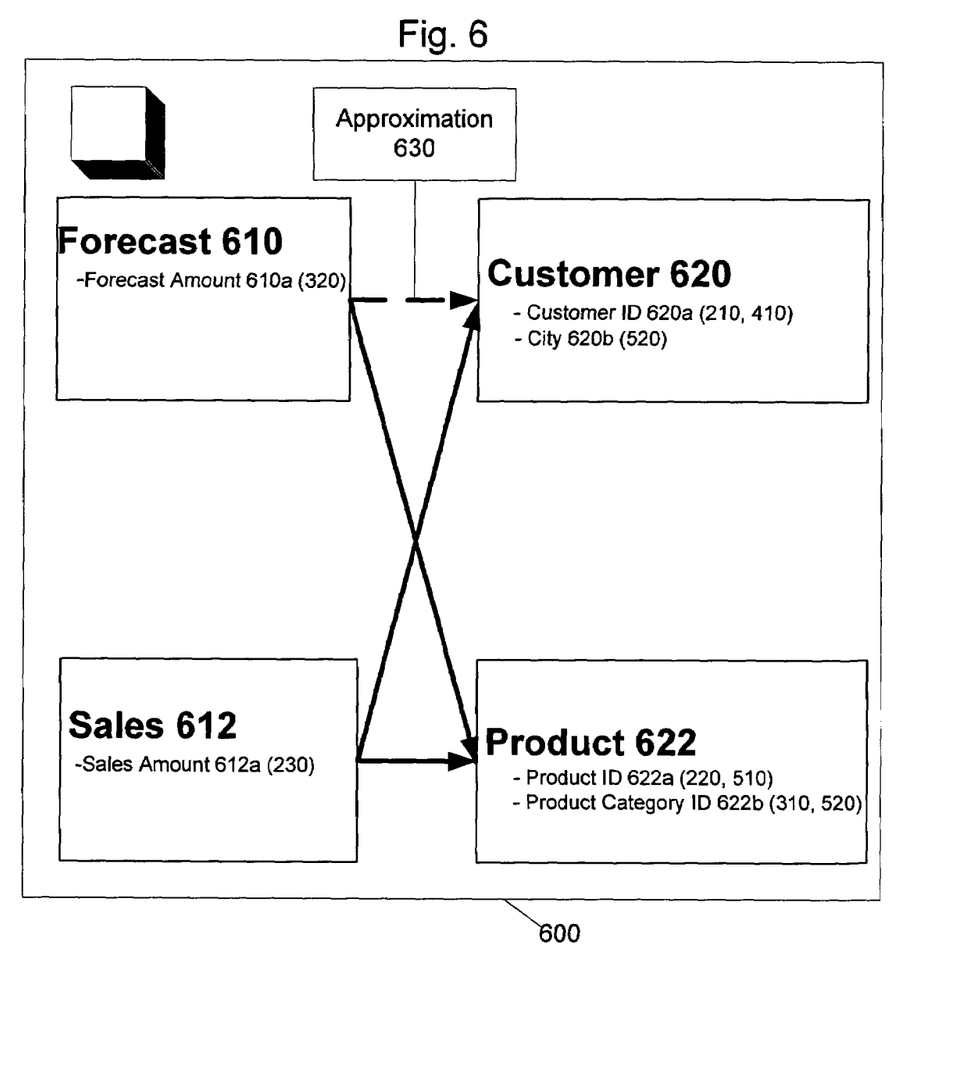
FIG. 6 is an analytical data cube derived from the tables of FIGS. 2-5 in accordance with one embodiment of the present invention.

Referring now to FIG. 6, analytical data cube 600 is an analytical model of the data from tables 200-500. Cube 600 has a first "Forecast" measure group 610 with the attribute "Product". "Forecast" measure group 610 includes a "Forecast Amount" measure 610a modeled after "Forecast Amount" column 320. As should be appreciated, "Forecast" measure group 610 may include additional measures (not shown) with the attribute "Product".

Cube 600 also has a second "Sales" measure group 612 with the attributes "Product" and "Customer". "Sales" measure group 612 includes a "Sales Amount" measure 612a modeled after "Sales Amount" column 230. As should be appreciated, "Sales" measure group 612 may include additional measures (not shown) with the attributes "Product" and "Customer".

Cube 600 also has a first "Customer" dimension 620 modeled according to the attribute "Customer". "Customer" dimension 620 includes two levels of granularity: "Customer ID" 620a and "City" 620b. "Customer ID" level 620a corresponds to "Customer ID" columns 210 and 410 of FIGS. 2 and 4, respectively. "City" level 620b corresponds to "City" column 420 of FIG. 4. Each city in "City" level 620b may include multiple customers identified in "Customer ID" level 620a. As should be appreciated, "Customer" dimension 620 may have other granularity levels corresponding according to other columns (not shown).

Cube 600 also has a second "Product" dimension 622 modeled according to the attribute "Product". "Product" dimension 622 includes two levels of granularity: "Product ID" 622a and "Product Category ID" 622b. "Product ID" level 622a corresponds to "Product ID" columns 220 and 510 of FIGS. 2 and 5, respectively. "Product Category ID" level 622b corresponds to "Product Category ID" columns 310 and 520 of FIGS. 3 and 5, respectively. Each product category identified in "Product Category ID" level 622b may include multiple products identified in "Product ID" level 622a. As should be appreciated, "Product" dimension 622 may have other granularity levels corresponding according to other columns (not shown).

"Sales" measure group 612 is tied to "Customer" dimension 620 according to the data in "Sales" table 200. "Sales" measure group 412 is also tied to "Product" dimension 622 according to the data in "Sales" table 200. "Forecast" measure group 610 is tied to "Product" dimension 622 according to the data in "Forecast" table 300. As should be appreciated, however, there is no data in "Forecast" table 300 to tie "Forecast" measure group 610 to "Customer" dimension 620. Thus, it is not known how to allocate forecasted sales of a particular product across multiple customers, and, therefore, forecasts must be allocated according to an approximation 630.

Forecasted sales of a particular product category across multiple customers may, for example, be approximated by allocating a sale to each customer having purchased a product in the product category. Particularly, for the 30 forecasted sales of product category "x", customers 1, 2, and 3 may each be allocated 30 sales. For the 10 forecasted sales of product category "y", customers 1 and 2 may each be allocated 10 sales. For the 2 forecasted sales of product category "z", customer 1 may be allocated 2 sales. As should be appreciated, although a sale is allocated to every customer, the sales are not "double" counted across customers. For example, in response to the query, "What were the total sales of product category "x" across all customers?", the answer is 30 rather than 90.

Forecasted sales of a particular product category across multiple customers may also be approximated by allocating an even portion of a sale to each customer having purchased a product in the product category. Particularly, for the 30 forecasted sales of product category "x", customers 1, 2, and 3 may each be allocated 10 sales. For the 10 forecasted sales of product category "y", customers 1 and 2 may each be allocated 5 sales. For the 2 forecasted sales of product category "z", customer 1 may be allocated 2 sales.

Forecasted sales of a particular product category across multiple customers may also be approximated by allocating to each customer a portion of a sale that is equal to the portion of products in the category sold to the customer. Particularly, for the 30 forecasted sales of product category "x", customer 1 may be allocated 6 sales, customer 2 may be allocated 9 sales, and customer 3 may be allocated 15 sales based on proportionate quantities of such item as sold to each customer according to "Sales" table 200 of FIG. 2. For the 10 forecasted sales of product category "y", customer 1 may be allocated 4 sales, and customer 2 may be allocated 6 sales. For the 2 forecasted sales of product category "z", customer 1 may be allocated 2 sales.

Forecasted sales of a particular product category across multiple customers may further be approximated by allocating a sale only to the principal customer buying products from the category. Particularly, for the 30 forecasted sales of product category "x", customer 3 may be allocated 30 sales based on customer 3 having already purchased the most products from category "x". For the 10 forecasted sales of product category "y", customer 2 may be allocated 10 sales based on similar reasoning. For the 2 forecasted sales of product category "z", customer 1 may be allocated 2 sales.

As should be appreciated, although exemplary cube 600 includes measure groups 610 and 612 with a common "Product" dimension 622, cubes including measure groups with no common dimensions are contemplated. For each such measure group, each of its measures is tied to a non-associated dimension using an approximation such as approximation 630. Thus, a cube in accordance with the present invention may include multiple approximations.

As should also be appreciated, measure groups in cube 600 may be tied to a particular dimension at different levels of granularity. For example, while "Forecast" measure group 610 is tied to "Product" dimension 612 at "Product Category" granularity level 622b, "Sales" measure group 612 is tied to "Product" dimension 612 at "Product" granularity level 622a. Measure groups may be tied to lower granularity levels using an approximation such as approximation 630. For example, sales forecasts for particular products may be estimated using approximation 630.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

While the invention has been described and illustrated with reference to specific embodiments, those skilled in the art will recognize that modifications and variations may be made without departing from the principles of the invention as described above and set forth in the following claims. For example, while the invention has been described with reference to a "Sales" table, a "Forecast" table, a "Customer" table, and a "Product" table the invention may be used in conjunction with any table from a relational database. Furthermore, the analytical data models of the present invention may comprise any number of dimensions corresponding to any number of data attributes. Accordingly, reference should be made to the appended claims as indicating the scope of the invention.

We claim:

1. A method implemented at least in part by a computer, the method in combination with first, second, and third tables of data, the first table organizing a first type according to a first attribute and a second attribute, the second table organizing a second type according to a third attribute, the third table organizing a third type according to the first attribute and the third attribute, the method comprising:

modeling a measure according to the second type of the second table;

modeling a first dimension according to the third attribute of the second table;

modeling a second dimension according to the second attribute of the first table;

tying the measure to the first dimension according to the third attribute of the second table to allow the measure to access data for the first dimension according to the third attribute; and tying the measure to the second dimension by, for each entry of the first dimension, allocating a value of the measure for the entry of the first dimension by:

identifying each row in the third table within which a value of the third attribute matches a value of the entry of the first dimension;

identifying a value of the first attribute within each identified row in the third table, and, for each identified value of the first attribute:

identifying each row in the first table that includes the value of the first attribute, the first table including no data for the measure;

identifying a value of the second attribute within each identified row in the first table; and identifying each entry in the second dimension for which a value of the entry of the second dimension matches an identified value of the second attribute; and allocating at least a portion of the value of the measure for the entry of the first dimension to at least one of each identified entry of the second dimension; and generating and displaying a data cube that comprises the measure and the first and second dimensions, the data cube being used for analytically modeling data from at least the first and second tables.

2. The method of claim 1, comprising modeling the measure according to the second type of the second table, the second table comprising data stored in a relational database.

3. The method of claim 1, comprising allocating a complete portion of the value of the measure for the entry of the first dimension to every identified entry of the second dimension.

4. The method of claim 1, comprising allocating less than a complete portion of the value of the measure for the entry of the first dimension to each identified entry of the second dimension.

5. The method of claim 4, comprising allocating an even portion of the value of the measure for the entry of the first dimension to each identified entry of the second dimension.

6. The method of claim 4, comprising allocating a proportional portion of the value of the measure for the entry of the first dimension to each identified entry of the second dimension.

7. The method of claim 1, comprising allocating a total value of the measure for the entry of the first dimension to a pre-determined principal identified entry of the second dimension.

8. A computer readable medium having stored thereon computer readable instructions in combination with first, second, and third tables of data, the first table organizing a first type according to a first attribute and a second attribute, the second table organizing a second type according to a third attribute, the third table organizing a third type according to the first attribute and the third attribute, computer readable instructions, when executed by a processor, cause the processor to perform the following steps:

modeling a measure according to the second type of the second table;

modeling a first dimension according to the third attribute of the second table;

modeling a second dimension according to the second attribute of the first table;

tying the measure to the first dimension according to the third attribute of the second table to allow the measure to access data for the first dimension according to the third attribute; and tying the measure to the second dimension by, for each entry of the first dimension, allocating a value of the measure for the entry of the first dimension by:

identifying each row in the third table within which a value of the third attribute matches a value of the entry of the first dimension;

identifying a value of the first attribute within each identified row in the third table, and, for each identified value of the first attribute:

identifying each row in the first table that includes the value of the first attribute, the first table including no data for the measure;

identifying a value of the second attribute within each identified row in the first table; and identifying each entry in the second dimension for which a value of the entry of the second dimension matches an identified value of the second attribute; and allocating at least a portion of the value of the measure for the entry of the first dimension to at least one of each identified entry of the second dimension; and generating and displaying a data cube that comprises the measure and the first and second dimensions, the data cube being used for analytically modeling data from at least the first and second tables.

9. The computer readable medium of claim 8, wherein the instructions cause the processor to perform the step of modeling the measure according to the second type of the second table, the second table comprising data stored in a relational database.

10. The computer readable medium of claim 8, wherein the instructions cause the processor to perform the step of allocating a complete portion of the value of the measure for the entry of the first dimension to every identified entry of the second dimension.

11. The computer readable medium of claim 8, wherein the instructions cause the processor to perform the step of allocating less than a complete portion of the value of the measure for the entry of the first dimension to each identified entry of the second dimension.

12. The computer readable medium of claim 11, wherein the instructions cause the processor to perform the step of allocating an even portion of the value of the measure for the entry of the first dimension to each identified entry of the second dimension.

13. The computer readable medium of claim 11, wherein the instructions cause the processor to perform the step of allocating a proportional portion of the value of the measure for the entry of the first dimension to each identified entry of the second dimension.

14. The computer readable medium of claim 8, wherein the instructions cause the processor to perform the step of allocating a total value of the measure for the entry of the first dimension to a pre-determined principal identified entry of the second dimension.

15. A system in combination with first, second, and third tables of data, the first table organizing a first type according to a first attribute and a second attribute, the second table organizing a second type according to a third attribute, the third table organizing a third type according to the first attribute and the third attribute, the system comprising:
   a processor operative to execute computer executable instructions; and
   memory having stored therein computer executable instructions for performing the following steps:
      modeling a measure according to the second type of the second table;
      modeling a first dimension according to the third attribute of the second table;
      modeling a second dimension according to the second attribute of the first table;
      tying the measure to the first dimension according to the third attribute of the second table to allow the measure to access data for the first dimension according to the third attribute; and
      tying the measure to the second dimension by, for each entry of the first dimension, allocating a value of the measure for the entry of the first dimension by:
         identifying each row in the third table within which a value of the third attribute matches a value of the entry of the first dimension;
         identifying a value of the first attribute within each identified row in the third table, and, for each identified value of the first attribute:
            identifying each row in the first table that includes the value of the first attribute, the first table including no data for the measure;
            identifying a value of the second attribute within each identified row in the first table; and
            identifying each entry in the second dimension for which a value of the entry of the second dimension matches an identified value of the second attribute; and
         allocating at least a portion of the value of the measure for the entry of the first dimension to at least one of each identified entry of the second dimension; and
      generating and displaying a data cube that comprises the measure and the first and second dimensions, the data cube being used for analytically modeling data from at least the first and second tables.

16. The system of claim 15, comprising computer executable instructions for performing the step of modeling the measure according to the second type of the second table, the second table comprising data stored in a relational database.

17. The system of claim 15, comprising computer executable instructions for performing the step of allocating a complete portion of the value of the measure for the entry of the first dimension to every identified entry of the second dimension.

18. The system of claim 15, comprising computer executable instructions for performing the step of allocating less than a complete portion of the value of the measure for the entry of the first dimension to each identified entry of the second dimension.

19. The system of claim 18, comprising computer executable instructions for performing the step of allocating an even portion of the value of the measure for the entry of the first dimension to each identified entry of the second dimension.

20. The system of claim 18, comprising computer executable instructions for performing the step of allocating a proportional portion of the value of the measure for the entry of the first dimension to each identified entry of the second dimension.

21. The system of claim 15, comprising computer executable instructions for performing the step of allocating a total value of the measure for the entry of the first dimension to a pre-determined principal identified entry of the second dimension.

* * * * *